US010298604B2

(12) United States Patent
Epstein et al.

(10) Patent No.: US 10,298,604 B2
(45) Date of Patent: May 21, 2019

(54) SMART HOME SECURITY SYSTEM

(71) Applicant: Cisco Technology, Inc., San Jose, CA (US)

(72) Inventors: Steve Epstein, Hashmonaim (IL); Avi Fruchter, Neve Daniel (IL); Moshe Kravchik, Ramat Beit Shemesh (IL); Yaron Sella, Beit Nekofa (IL); Itay Harush, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 176 days.

(21) Appl. No.: 15/256,651

(22) Filed: Sep. 5, 2016

(65) Prior Publication Data
US 2018/0069879 A1 Mar. 8, 2018

(51) Int. Cl.
*H04L 12/28* (2006.01)
*H04L 29/06* (2006.01)
(Continued)

(52) U.S. Cl.
CPC ....... *H04L 63/1425* (2013.01); *G06N 99/005* (2013.01); *H04L 12/2818* (2013.01);
(Continued)

(58) Field of Classification Search
CPC .. H04L 63/1425; H04L 63/0861; H04W 4/12; G06N 99/005
(Continued)

(56) References Cited

U.S. PATENT DOCUMENTS

| 8,453,234 B2 | 5/2013 | Dawson et al. |
| 9,106,536 B2 | 8/2015 | Christodorescu et al. |

(Continued)

FOREIGN PATENT DOCUMENTS

| CN | 105353727 A | 2/2016 |
| KR | 101500448 B1 | 3/2015 |

(Continued)

OTHER PUBLICATIONS

Anderson, Blake et al.; Classifying Encrypted Traffic With TLS-Aware Telemetry, Jan. 2016, CERT, FloCon2016.
(Continued)

*Primary Examiner* — Evans Desrosiers

(57) ABSTRACT

In one embodiment, a system is described, the system including a network gateway in communication with a plurality of original equipment manufacturer (OEM) servers, a household behavior model processor which models a household behavior model based at least on expected usage of each of a plurality of OEM network appliances, wherein each one appliance of the plurality of OEM network appliances is associated with one of the plurality of OEM servers, and behavior of users associated with the network gateway, an anomaly detector which determines, on the basis of the household behavior model, if an anomalous control message which has been sent to one of the plurality of OEM network appliances from one of the OEM servers has been received at the network gateway, and a notification server which sends a notification to an application on an administrator's device upon receipt of the anomalous control message at the network gateway. Related systems, apparatus, and methods are also described.

20 Claims, 8 Drawing Sheets

(51) Int. Cl.
*G06N 99/00* (2019.01)
*H04W 4/12* (2009.01)

(52) U.S. Cl.
CPC ...... *H04L 12/2825* (2013.01); *H04L 12/2834* (2013.01); *H04L 63/0861* (2013.01); *H04L 63/10* (2013.01); *H04L 63/1408* (2013.01); *H04L 63/20* (2013.01); *H04W 4/12* (2013.01); *H04L 2463/082* (2013.01)

(58) Field of Classification Search
USPC .......................................................... 726/4
See application file for complete search history.

(56) References Cited

U.S. PATENT DOCUMENTS

| | | | |
|---|---|---|---|
| 9,342,391 | B2 | 5/2016 | Kim |
| 9,384,075 | B2 | 7/2016 | Kim |
| 2004/0225627 | A1 | 11/2004 | Botros et al. |
| 2012/0137362 | A1 | 5/2012 | Amaya Calvo et al. |
| 2015/0067762 | A1* | 3/2015 | Belenky .................. H04L 63/20 726/1 |
| 2015/0134116 | A1 | 5/2015 | Li et al. |
| 2015/0221212 | A1 | 8/2015 | Sakamoto et al. |
| 2015/0253364 | A1* | 9/2015 | Hieda ...................... H04Q 9/00 702/62 |
| 2015/0309484 | A1 | 10/2015 | Lyman |
| 2016/0055422 | A1 | 2/2016 | Li |

FOREIGN PATENT DOCUMENTS

| | | |
|---|---|---|
| WO | WO2013/053817 | 4/2013 |
| WO | WO2016/039845 | 3/2016 |

OTHER PUBLICATIONS

Ayday, Erman et al.; Secure, Intuitive and Low-Cost Device Authentication for Smart Grid Networks, 2011 IEEE Consumer Communications and Networking Conference (CCNC), Las Vegas, NV, 2011, pp. 1161-1165. doi: 10.1109/CCNC.2011.5766359.

Cho, Joon-Sic et al.; CAISMS: A Context-Aware Integrated Security Management System for Smart Home, The 9th International Conference on Advanced Communication Technology, Gangwon-Do, 2007, pp. 531-536. doi: 10.1109/ICACT.2007.358411.

De Araújo Ribeiro, Tiago José et al.; Projeto De Um Gateway Para Automação Residencial, Revista de Engenharia e Pesquisa Aplicada 1, No. 1 (2016).

Granzer, Wofgang et al.; Security in Building Automation Systems, in IEEE Transactions on Industrial Electronics, vol. 57, No. 11, pp. 3622-3630, Nov. 2010. doi: 10.1109/TIE.2009.2036033.

Korolov, Maria; Security Pros Worried About Stolen Credentials, Alert Volumes (Jan. 13, 2016).

Margulies, Jonathan; Garage Door Openers: An Internet of Things Case Study, in IEEE Security & Privacy, vol. 13, No. 4, pp. 80-83, Jul.-Aug. 2015. doi: 10.1109/MSP.2015.80.

McGrew, David et al.; Understanding Network Traffic Through Intraflow Data, FloCon2016, Jan. 2016.

Wang, Zhanyi; The Applications of Deep Learning on Traffic Identification (2010), Blackhat.com [viewed Jul. 2016].

Xu, Kuai et al.; Behavior Profiling and Analysis in Wireless Home Networks, 2010 7th IEEE Consumer Communications and Networking Conference, Las Vegas, NV, 2010, pp. 1-2. doi: 10.1109/CCNC.2010.5421571.

McGrath, Robert; Margulies on an IOT "Garage Door" (May 17, 2016).

International Search Report and Written Opinion, dated Nov. 20, 2017, issued in corresponding PCT application No. PCT/IB2017/054327.

* cited by examiner

SMART HOME SECURITY SYSTEM

TECHNICAL FIELD

The present disclosure generally relates to security systems for smart homes.

BACKGROUND

Typical security solutions for smart home or home automation environments focus on malware detection or prevention of malicious attacks such as Domain Name System (DNS) spoofing, Distributed Denial of Service (DDOS) etc. on the smart home. Solutions typically implement some scale-able form of well-known intrusion prevention system (IPS)/intrusion detection system (IDS) detection using deep packet inspection with signature checking technology in the gateway or cloud.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

A system is described, the system including a network gateway in communication with a plurality of original equipment manufacturer (OEM) servers, a household behavior model processor which models a household behavior model based at least on expected usage of each of a plurality of OEM network appliances, wherein each one appliance of the plurality of OEM network appliances is associated with one of the plurality of OEM servers, and behavior of users associated with the network gateway, an anomaly detector which determines, on the basis of the household behavior model, if an anomalous control message which has been sent to one of the plurality of OEM network appliances from one of the OEM servers has been received at the network gateway, and a notification server which sends a notification to an application on an administrator's device upon receipt of the anomalous control message at the network gateway. Related systems, apparatus, and methods are also described.

Exemplary Embodiment

Figure 1:
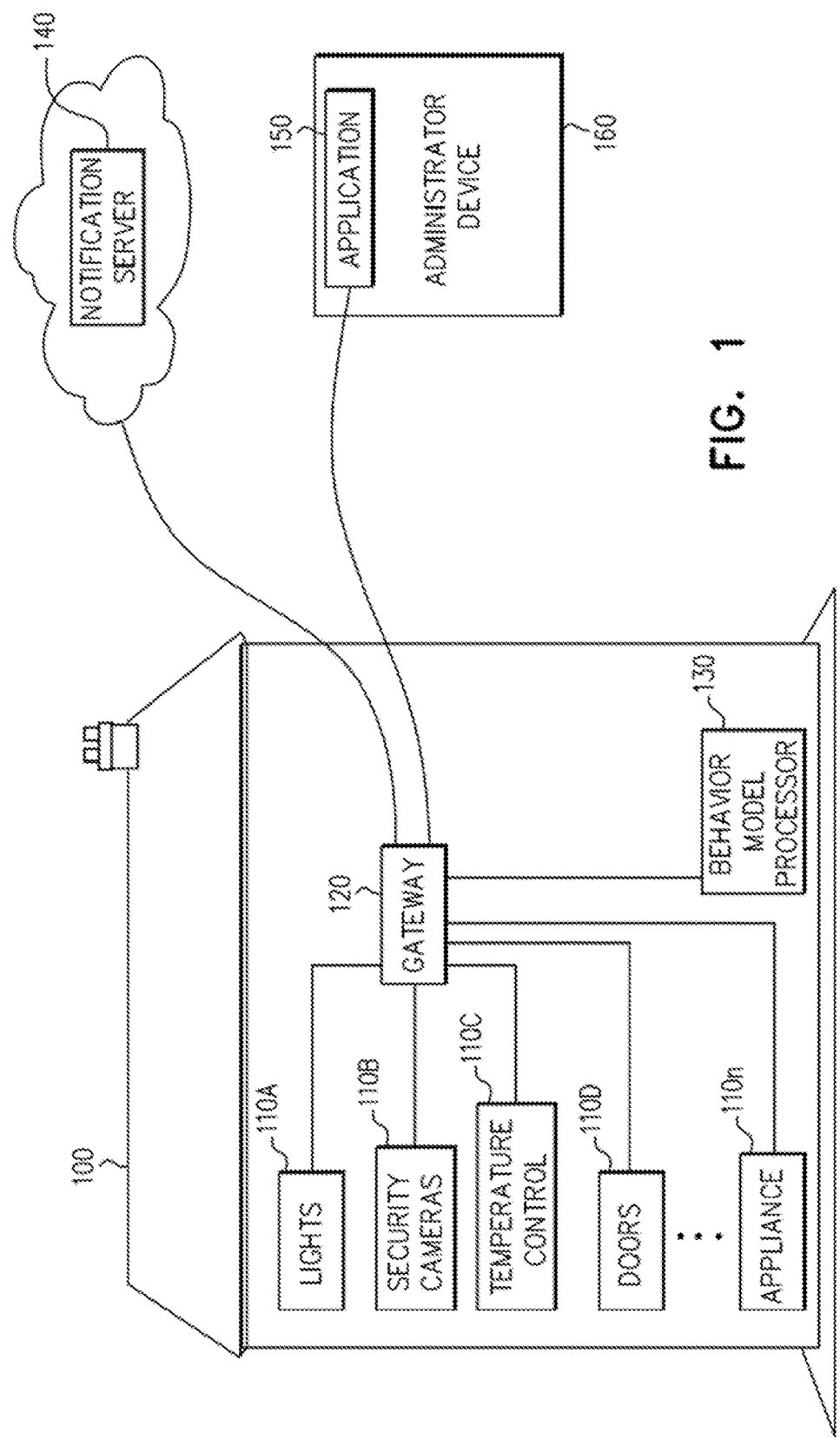
FIG. 1 is a simplified partly pictorial partly block diagram illustration of a smart home security system constructed and operative in accordance with an embodiment of the present disclosure.

Reference is now made to FIG. 1 which is a simplified partly pictorial partly block diagram illustration of a smart home security system constructed and operative in accordance with an embodiment of the present disclosure. The smart home 100 of FIG. 1 comprises a plurality of original equipment manufacturer (OEM) network appliances 110A-110n which are in communication with a home network gateway 120. The OEM network appliances 110A-110n are depicted, by way of example, as being household lighting fixtures 110A, security cameras 110B, temperature controls 110C, doors 110D, and a generic "appliance" 110n. It is appreciated that the household lighting fixtures 110A may in fact be several OEM network appliances, for instance, one OEM network appliance for the master bedroom, a second OEM network appliance for a second bedroom, and so forth for each room of the house. Similarly, each depending on configuration and other matters, there might be several OEM network appliances for security cameras, temperature controls, doors, and so forth for a given smart home, such as smart home 100. FIG. 1 is merely an exemplary depiction of one embodiment of a smart home.

It is also appreciated that the security level required for each one of the OEM network appliances 110A-110n may not necessarily be the same security level. By way of example, a command to turn on a light in a second floor bathroom might not be as high a risk as a command to open an outside door (among the doors 110D) to the smart home 100.

A potentially viable threat to the security of the smart home 100 is an 'invalid user' accessing the smart home 100 via legal valid messages based on a stolen identity (stolen credentials, stolen token, stolen keys, stolen phone etc.). This may be prevalent since each OEM will typically provide its own authentication and security solution to their appliance and its associated application (or "app"), with some such security solutions possibly being quite weak.

The term "app" is understood to refer to a self-contained program or piece of software designed to fulfill a particular purpose; an application, especially as downloaded by a user to a mobile device. Alternatively, an app might be local, as explained below. In the present context, a typical app might be a control for turning on and off or dimming/brightening the light fixture OEM network appliance 110A. Another example might be an app which is used to lock or unlock one of the doors 110D, such as an internal door, like the pantry door, or an external door, such as the front door or garage door. An app for locking or unlocking one of the doors 110D might be located on a smart phone or tablet computer, or alternatively, might be located on a keypad of the lock. An app located on a smart phone or tablet computer will typically communicate with the controlled item via a remote cloud-based server.

Hence, once the authentication of the OEM app by the OEM Server is broken, that app with the stolen identity may become the source of home theft, vandalism, espionage or loss of privacy.

In order to replace the suspect identity maintained by the app with a secure identity and authentication by a service provider while limiting the inconvenience to the home user, the home network gateway 120 is in communication with a behavior model processor 130 which models expected household behavior based on, at least: behavior of users associated with the home network gateway 120 and expected usage of each of the plurality of OEM network appliances 110A-110n. It is appreciated that although the behavior model processor 130 is depicted as being located in the smart home 100, the behavior model processor 130 might be located in the cloud or may comprise components which are located in the smart home 100 and other components which are located in the cloud.

In addition, the home network gateway 120 is in communication with a cloud based notification server 140 which sends and receives notifications to an application 150 on an administrator's device 160. The administrator's device may be a smart phone, a tablet computer, a laptop or desktop computer, or other appropriate device, as is known in the art. The administrator is typically a head of the household or residents of the smart home 100 (e.g., parents, older children, etc.). In some embodiments, the notification may be sent in a cryptographically secure fashion, e.g., the notification may be sent over an encrypted network connection; the notification may itself be encrypted; the notification may be cryptographically signed; the notification may include a message authentication code (MAC); and so forth, as is known in the art.

Figure 2:
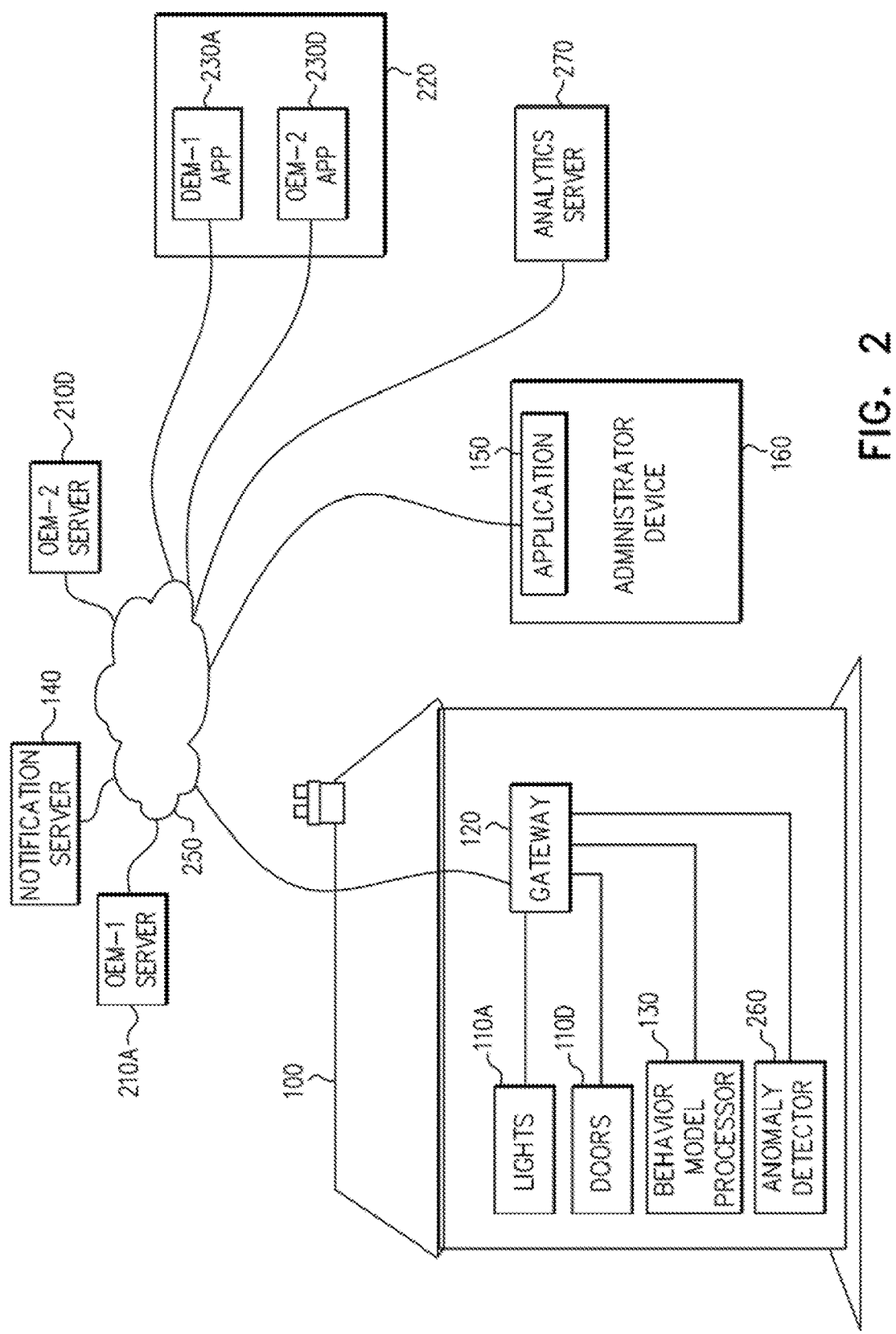
FIG. 2 is one embodiment of the simplified partly pictorial partly block diagram illustration of a smart home security system of FIG. 1.

Reference is now made to FIG. 2, which is one embodiment of the simplified partly pictorial partly block diagram illustration of a smart home security system of FIG. 1. FIG. 2 shows most of the elements of FIG. 1 but, in addition, focuses on two particular OEM network appliances, i.e. the OEM network appliance controlling the lights 110A, and the OEM network appliance controlling the doors 110D. The OEM network appliance controlling the lights 110A is in contact, through the network gateway 120, with an OEM server, depicted here as OEM-1 server 210A. Similarly, the OEM network appliance controlling the doors 110D is in contact, through the home network gateway 120, with an OEM server, depicted here as OEM-2 server 210D. A user device 220 has apps, such as app OEM-1 APP 230A, for communication with the OEM network appliance controlling the lights 110A via the OEM-1 server 210A. Similarly, the user device 220 has app OEM-2 APP 230D for communication with the OEM network appliance controlling the doors 110D via the OEM-2 server 210D. All such communications typically occur over a network 250, such as the Internet.

As was noted above, however, it is appreciated that communication may also occur locally between the app and the controlled appliance. By way of example, a light switch which is an interface to the lights 110A may comprise the app, but without recourse to the OEM server. Similarly, the doors 110D may have a local keypad comprising their associated controlling app. The local app would communicate with the home network gateway 120, which would then relay the commands to the appropriate appliance (e.g. the lights 110A or the one of the doors 110D), and would also relay the relevant packets for behavior model processing (as per item 130, discussed above in the description of FIG. 1, for example, or as will be explained below in greater detail).

By way of example, the user of device 220 may want to open/close one of the doors of the smart home 100. Using the user device 220, the user accesses the OEM-2 APP 230D, and executes a command to open/close one of the doors of the smart home 100. The command is communicated via the network 250 to the OEM-2 Server 210D. OEM-2 Server 210D then communicates the command to the gateway 120. In the absence of the smart home security system of FIG. 1, the gateway relays the command to one of the doors 110D, which, in accordance with the command, opens or closes.

However, when the smart home security system of FIG. 1 is implemented, an anomaly detector 260, which detects anomalies based on the behavioral model developed by the behavioral model processor 130 (FIG. 1), first determines if the command to open/close one of the doors of the smart home 100 is an anomaly. By way of example, if, during typical usage, the doors of the smart home 100 remain closed between midnight and 6:00 AM, a command to open one of the doors of the smart home 100 which is received at the home network gateway 120 at 3:00 AM is considered to be an anomaly. When the anomaly detector 260 determines that a command received by the home network gateway 120 is an anomaly, the notification server then sends a notification to the application 150 on the administrator's device 160.

If the administrator's device 160 replies to the notification with an approval message, then the command to open the door will be executed.

The interaction of the home network gateway 120, the behavior model processor 130 (FIG. 1), and the anomaly detector 260 is now discussed. It is appreciated that in some embodiments, the home network gateway 120, the behavior model processor 130 (FIG. 1), and the anomaly detector 260 may comprise a single physical device, or, may be comprised together within a single physical device.

Based on DNS messages, network discovery, and related means, the gateway is able to understand and store destinations of messages sent from the OEM servers, such as OEM-1 Server 210A and OEM-2 Server 210D to specific OEM appliances in the smart home, such as the OEM network appliance controlling the lights 110A and the OEM network appliance controlling the doors 110D. That is to say, the source IP addresses and destination IP addresses of these messages can be learned by the home network gateway 120, even if the messages themselves are encrypted using HTTPS or another protocol for secure communication.

Machine learning algorithms can then be implemented in at least one of the home network gateway 120, the behavior model processor 130 (FIG. 1), and the anomaly detector 260 in order to classify the messages as maintenance messages, such as software updates, data collection, and so forth; or as control messages, such as commands to move a camera (in the case of the security cameras 110B of FIG. 1), turn off a light (in the case of the light fixtures 110A), or open a door (in the case of the doors 110D). A control message is defined, for the purposes of the present discussion, as a message that will affect the operation of a 'thing' and change its state such as: open door, change temperature to fridge, close window, turn off air conditioner, etc. A "Thing" is understood to refer to everyday objects and physical devices having network connectivity. Control messages are understood as being distinct from a software update or a 'collect data' message (which, as mentioned above, are collectively termed "maintenance messages"). Machine learning of this type might comprise supervised learning, where each appliance type is analyzed and its characteristics are learned separately. A model will be extracted for each appliance type. Each model will extract features based on side channel information, based, for example, on numbers of packets, packet sizes, byte distributions, time, and so forth. Alternatively, and additionally, generalized learning will occur across all appliances.

For example, a generalized learning model could capture a pattern that, during certain hours, shortly after one of the doors 110D of the smart home 100 is opened, several electronic appliances (e.g., lights 110A, a smart television, a microwave, air conditioning (subsumed in the temperature control 110C of FIG. 1), etc.) in the smart home 100 are also activated. As another example, the generalized learning model might capture the pattern that prior to opening the garage door from the inside, certain cellular phones are disconnected from the smart home 100 WiFi network.

It is appreciated that the various servers mentioned herein might, in implementation, comprise a single server. Additionally, the various servers mentioned herein might be disposed in other locations besides those in which they are described as being located in.

Figure 3:
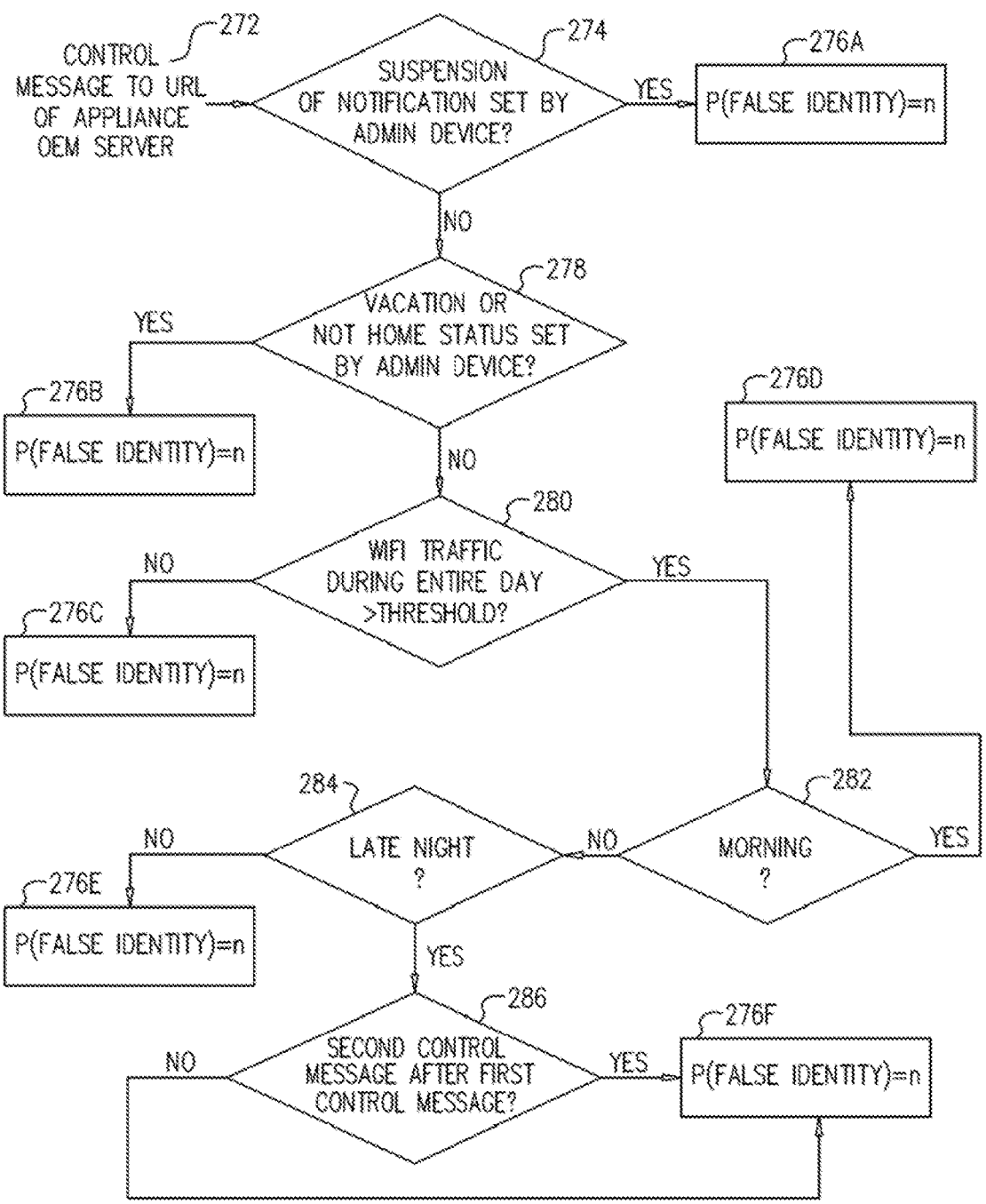
FIG. 3 is a flow chart of one generalized embodiment of a rule based method for detection of anomalous usage in the smart home security system of FIG. 1.

Reference is now made to FIG. 3, which is a flow chart of one generalized embodiment of a rule based method for detection of anomalous usage in the smart home security system of FIG. 1. A control message is sent to the URL of an appliance specific OEM server (step 272), such as OEM-1 Server 210A (FIG. 2) and OEM-2 Server 210D (FIG. 2). If, the home network gateway 120 (FIG. 1) determines, at step 274, that the application 150 (FIG. 1) on the administrator's device 160 (FIG. 1) has suspended notifications, then the analytics server 270 (FIG. 2) will be invoked to use a machine learning decision tree algorithm based on one or more models of the behavior for the smart house 100 (FIG. 1) in question, as well as possibly using some information from one or more models of other smart houses 100 (FIG. 1). Note that any machine learning (SVM, Logistic regression, neural nets, naïve Bayes etc.) classification algorithm may be used by the analytics server 270 (FIG. 2). Rule based methods and decision trees are mentioned herein throughout by way of example, and for ease of description. It is appreciated that the methods described herein are invoked only by control messages and not by other types of messages, so that the application 150 (FIG. 1) on the administrator's device 160 (FIG. 1) is not overloaded with notifications requiring acknowledgements or approvals.

The analytics server 270 (FIG. 2) will, at step 276A, determine a probability that the application 150 (FIG. 1) on the administrator's device 160 (FIG. 1) has been invoked using a false identity. If the probability is above or below a given threshold, the notification server 140 (FIG. 1) might be activated, as described below, with reference to FIG. 4.

If, however, the home network gateway 120 (FIG. 1) determines, at step 274, that the application 150 (FIG. 1) on the administrator's device 160 (FIG. 1) has not suspended notifications, then, at step 278, the home network gateway 120 (FIG. 1) determines if the application 150 (FIG. 1) on the administrator's device 160 (FIG. 1) has set a vacation (or not home) status. As a positive result of the determining, the analytics server 270 (FIG. 2) will, at step 276B, determine a probability that the application 150 (FIG. 1) on the administrator's device 160 (FIG. 1) has been invoked using a false identity.

The determination, at step 276B, of the probability that that the application 150 (FIG. 1) on the administrator's device 160 (FIG. 1) has been invoked using a false identity is similar to the determination at step 276A. However, it is appreciated here at step 276B, and below in similar determinations that that the application 150 (FIG. 1) on the administrator's device 160 (FIG. 1) has been invoked using a false identity that each individual determination will be performed with inputs appropriate to that point in the flow chart of FIG. 3. Accordingly, each step of determination of probability that that the application 150 (FIG. 1) on the administrator's device 160 (FIG. 1) has been invoked using a false identity is indicated with as a different variation of step 276 (i.e., 276A-276F).

If, however, the home network gateway 120 (FIG. 1) determines at step 278 that the application 150 (FIG. 1) on the administrator's device 160 (FIG. 1) has not set a vacation/not home status, then the home network gateway 120 (FIG. 1) determines, at step 280, if WiFi traffic in the smart home 100 (FIG. 1) exceeds a given threshold over a time-range which may be set as a sliding window. By way of example, during the hours from 12:30 AM to 5:30 AM there may typically be minimal WiFi traffic, so the threshold may be set to a low threshold value. However, by contrast, between 4:00 PM to 11:30 PM there may be large quantities of WiFi traffic, and the threshold may be set to a high threshold value. Alternatively, the amount of Wifi traffic may be measured on a daily basis, or on the basis of some other time period.

If the WiFi traffic in the smart home 100 (FIG. 1) does not exceed the given threshold, then the analytics server 270 (FIG. 2) is invoked in step 276C, to determine a probability that the application 150 (FIG. 1) on the administrator's device 160 (FIG. 1) has been invoked using a false identity.

If, however, the home network gateway 120 (FIG. 1) determines, at step 280, that WiFi traffic in the smart home 100 (FIG. 1) does exceed the given threshold, then the time of day (e.g., morning, late night, etc.) is determined at steps 282 and 284, in order to determine, by the analytics server 270 (FIG. 2), if the observed behavior is anomalous in light of the time of day. If the observed behavior is determined to be anomalous in light of the time of day, then step 276D or 276E is invoked as above, to determine a probability that the application 150 (FIG. 1) on the administrator's device 160 (FIG. 1) has been invoked using a false identity.

If, however, anomalous behavior is not determined by the analytics server 270 (FIG. 2), then, at step 286, it is determined if a second control message is received soon or immediately after the control message of step 272. By way of example, the front door 110D (FIG. 1) may frequently be closed after one particular light 110A is turned off. In this case, step 276F may be invoked regardless of whether or not second control message is received soon or immediately after the control message of step 272. The result of the final determination of the probability at step 276F may result in a requirement that one holder of an administrator device 160 authorize the action which would otherwise result from one or both of the control messages at steps 272 and 286. Or, alternatively, the action is executed without requiring any authorization.

The above steps are and can be generalized, extended, and so forth, as required.

Figure 4:
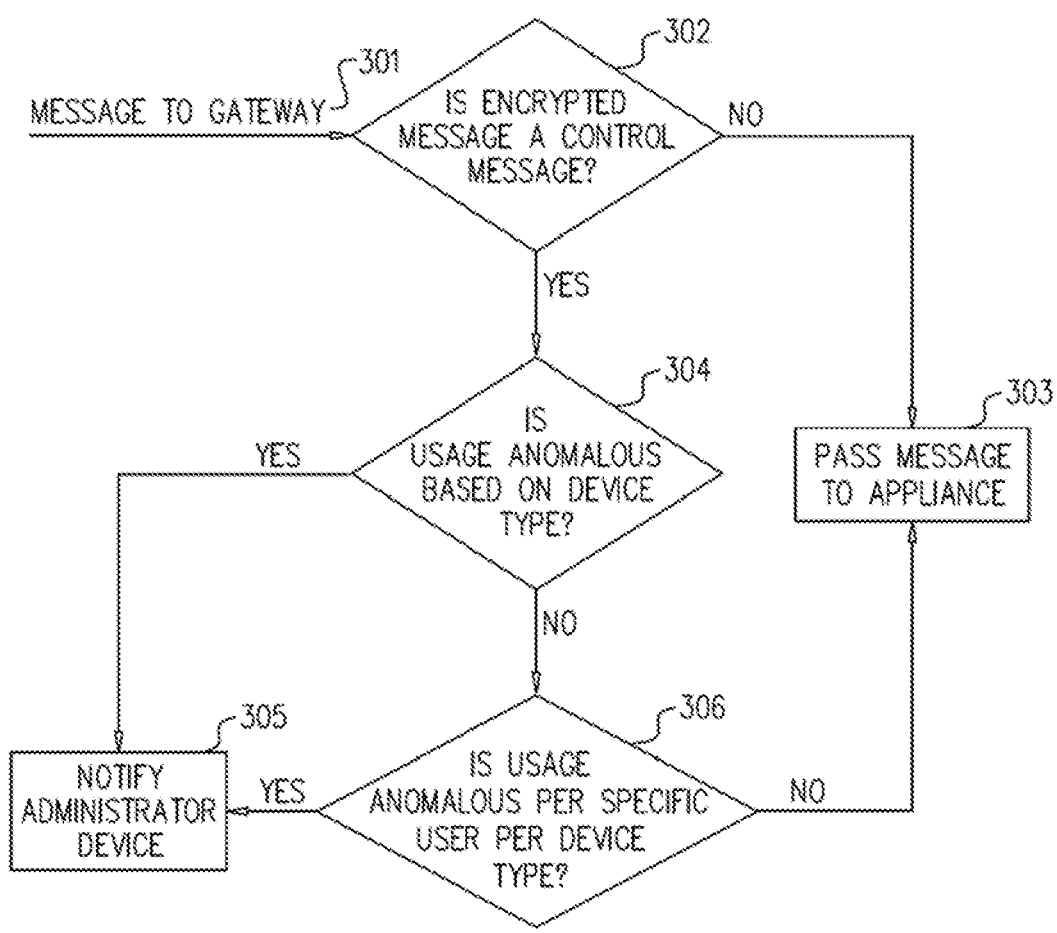
FIG. 4 is a simplified flow chart depicting a method for detection of anomalous usage in encrypted packets in the smart home security system of FIG. 1.

Reference is now made to FIG. 4, which is a simplified flow chart depicting a method for detection of anomalous usage in encrypted packets in the smart home security system of FIG. 1. For each type of network appliances 110A-110n (FIG. 1), the home network gateway 120 (FIG. 1), in conjunction with its associated behavior model processor 130 (FIG. 1), and, supported by a cloud based analytics server 270 (FIG. 2), will model expected usage and behavior of the house, specifically when control messages are to be expected per appliance, either per user or based on typical usage of the entire population.

Control message detection is performed, as explained below, in a manner that works on encrypted network traffic, as well as non-encrypted network traffic, by looking at features such as a number of packets, packet size, packet frequency, byte distribution, etc.

In step 301, a message is received at the home network gateway 120 (FIG. 1). The home network gateway 120 (FIG. 1) determines (as described below) if the encrypted message is a control message (step 302). If the message is not a control message, then the control message is passed to the appropriate one of the OEM network appliances 110A-110n of FIG. 1 (step 303). On the other hand, if the encrypted message is determined to be a control message (in step 302), then the home network gateway 120 (FIG. 1) determines if the control message is for anomalous usage based on the device type (step 304). If, based on the device type, the control message is for anomalous usage, then, at step 305 the home network gateway 120 (FIG. 1) notifies the notification server 140 (FIG. 2) that a notification should be sent to the application 150 (FIG. 1) on the administrator's device 160 (FIG. 1).

On the other hand, based on the device type, if the control message is not for anomalous usage (step 304), the home network gateway 120 (FIG. 1) determines if the usage is anomalous based on the specific user of the specific device (step 306). For example, a resident of the smart home 100 (FIG. 1) might work nights, and only return home at 4:00 AM during week nights. Assuming that the resident has a smart phone of a particular make and model, then a control message received at 3:58 AM on a Tuesday morning which originates from a smart phone of the same particular make and model would, once the behavior is learned, not be categorized as anomalous. If the home network gateway 120 (FIG. 1) determines at step 306 that the usage is not anomalous, then the control message is passed to the appropriate one of the OEM network appliances 110A-110n (FIG. 1), as in step 303, above. If the home network gateway 120 (FIG. 1) determines at step 306 that the usage is anomalous, then the home network gateway 120 (FIG. 1) notifies the notification server 140 (FIG. 2) that a notification should be sent to the application 150 (FIG. 1) on the administrator's device 160 (FIG. 1).

The modelling will be based, at least, on features such as:
Time of day;
Day of the week, including a distinction between weekends vs. weekdays;
Network traffic or other network activities in the home, e.g. patterns of WiFi usage which is typical in the home network (such as the example of a member of the household regularly arriving home at 4:00 AM on week nights, above);
Smart home 100 (FIG. 1) usage patterns—for example, a foyer light might typically be turned on during night time hours following opening the front door, heat or air conditioning might be turned on or off before 11:00 PM, and so forth; and
User settings set by an owner or administrator of the smart home 100 (FIG. 1) vis-à-vis a Service Provider App (e.g., I am on vacation, I am not home etc.).

The modelling will, over time, continue, and will therefore take feedback patterns into account. By way of example, if a notification to allow a garage door to open is approved consistently every night at 2:00 AM, then gradually the model will come to include not needing to ask in order to allow the garage door to open at 2:00 AM.

Based on a result of the analytics performed by the home network gateway 120 (FIG. 1), its associated behavior model processor 130 (FIG. 1), and the cloud based analytics server 270 (FIG. 2), upon detection of an anomalous control message to one of the OEM network appliances 110A-110n of FIG. 1, the home network gateway 120 (FIG. 1) will trigger the notification server 140 (FIG. 1) in the cloud 250 (FIG. 2) to send a notification (such as a push notification) to the application 150 (FIG. 1) on the administrator's device 160 (FIG. 1). Alternatively, one of the administrators may configure one or all of the home network gateway 120 (FIG. 1), its associated behavior model processor 130 (FIG. 1), and the cloud based analytics server 270 (FIG. 2) to consider behavior of a particular one of the OEM network appliances 110A-110n of FIG. 1 anomalous behavior, should that behavior occur outside of a given time range.

Depending on the criticality from a home security and privacy perspective of the one of the OEM network appliances 110A-110n of FIG. 1 (e.g. thermostat commands vs door commands), the home network gateway 120 (FIG. 1) may:
quarantine the control message until the smart home 100 (FIG. 1) administrator utilizes the application 150 (FIG. 1) on the administrator's device 160 (FIG. 1) in order to reply affirmatively to the notification (control message expected) and the confirmation is received via the cloud by the gateway;
notify the application 150 (FIG. 1) on the administrator's device 160 (FIG. 1), i.e. after the one of the OEM network appliances 110A-110n of FIG. 1 receives a command; or
not notify the application 150 (FIG. 1) on the administrator's device 160 (FIG. 1) at all.

Additionally, the administrator may respond to the home network gateway 120 (FIG. 1) via the application 150 (FIG. 1) to set a dormant time for any or all of the OEM network appliances 110A-110n of FIG. 1, allowing future commands to be sent to the one of the network appliances 110A-110n of FIG. 1 appliance during a particular period of time without requiring further notification. This may be done on a one-time basis, for a particular time period, or for an indefinite amount of time. By way of example, the smart house 100 (FIG. 1) administrator may allow a garage door to be opened when a delivery is expected on a one-time basis, during a time range when the delivery is expected. Alternatively, the smart house 100 (FIG. 1) administrator may allow the garage door to be opened during a time range for the duration of summer vacation. Still further alternatively, the smart house 100 (FIG. 1) administrator may allow a garage door to be opened on weekdays in early evening hours. Table 1 summarizes the above.

TABLE 1

| TIME RANGE | DURATION | EXPLANATION |
| --- | --- | --- |
| 9:00 AM-12:30 PM | Today only | Delivery expected |
| 8:00 PM-11:30 PM | July-August | School vacation |
| 5:30 PM-7:00 PM | Weekdays | Daily arrival at home |

Using the above system, the smart home 100 (FIG. 1) administrator may create and populate a white list of anomalies.

Figure 5:
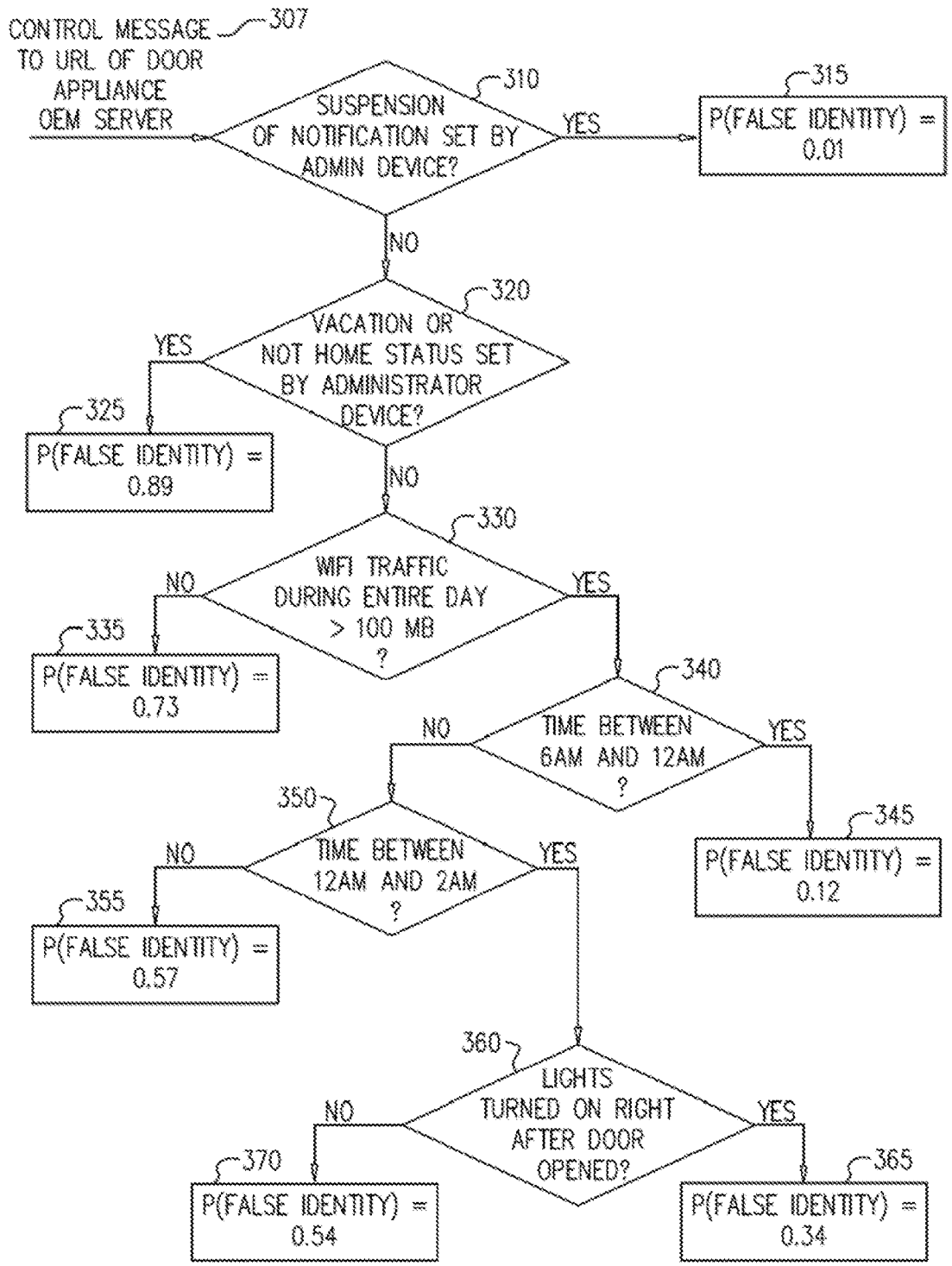
FIG. 5 is a decision tree as used in an exemplary embodiment of the smart home security system of FIG. 1.

Reference is now made, in view of the above discussion of FIGS. 3 and 4, to FIG. 5, which is a version of the decision tree of FIG. 3 as used in an exemplary embodiment. A control message is sent to the URL of an OEM server of a particular appliance (step 307), in this exemplary case, an OEM server controlling the one of the doors 110D (FIG. 1) of the smart house, such as OEM-1 Server 210A and OEM-2 Server 210D (FIG. 2). At step 310, the home network gateway 120 (FIG. 1) determines if the application 150 (FIG. 1) on the administrator's device 160 (FIG. 1) has been used to suspend notifications. If the determination is positive, then the analytics server 270 (FIG. 2) will, at step 315, determine a probability that the application 150 (FIG. 1) on the administrator's device 160 (FIG. 1) has been invoked using a false identity. In the present example, the probability is given as 0.01 (i.e., 1%).

If, however, it is determined in step 310 that there was no suspension of notifications, then the home network gateway 120 (FIG. 1) determines at step 320 if the application 150 (FIG. 1) on the administrator's device 160 (FIG. 1) has set vacation/not home status. As a positive result of the determining, the analytics server 270 (FIG. 2) will be invoked, as above. In the present example, the determined probability (step 325) is shown as being 0.89 (i.e., 89%) that a false identity is being used.

If, however, it is determined in step 320 that vacation/not home status was not set, then if WiFi traffic in the smart home 100 (FIG. 1) does not exceed the given example threshold of more than 100 MB during the entire day (step 330), the analytics server 270 (FIG. 2) will be invoked, as above. In the present example, the determined probability (step 335) is shown as being 0.73 (i.e., 73%) that a false identity is being used.

If, however, it is determined in step 330 that WiFi traffic in the smart home 100 (FIG. 1) does exceed the given example threshold of more than 100 MB during the entire day, then if the time of day is, for example, between 6:00 AM and 12:00 AM (step 340) then the analytics server 270 (FIG. 2) will be invoked, as above. In the present example, the determined probability (step 345) that the door will be actuated in the time period between 6:00 AM and 12:00 AM is likely, and FIG. 5 shows the probability as only 0.12 (i.e., 12%) that a false identity is being used.

If the time is not between the exemplary 6:00 AM and 12:00 AM, then a determination is made at step if the time is, for example, between 12:00 AM and 2:00 AM. If the time is not between the exemplary 12:00 AM and 2:00 AM, the analytics server 270 (FIG. 2) will be invoked, as above. In the present example, the determined probability (step 355) that the door will be actuated in the time period between the exemplary 12:00 AM and 2:00 AM is not likely, and FIG. 5 shows the probability as being 0.57 (i.e., 57%) that a false identity is being used.

However, if the time is between the exemplary 12:00 AM and 2:00 AM, then a determination is made (step 360) if the lights 110A (FIG. 1) are turned on immediately after the door is opened. If the lights 110A (FIG. 1) are turned on immediately after the door is opened, then the analytics server 270 (FIG. 2) will be invoked, as above. In the present example, the determined probability, shown at step 365 is shown to be 0.34 (i.e., 34%) that a false identity is being used. On the other hand, if the lights 110A (FIG. 1) are not turned on immediately after the door is opened (step 370), then the analytics server 270 (FIG. 2) will be invoked, as above. In the present example, the determined probability, is shown to be 0.54 (i.e., 54%) that a false identity is being used.

It is appreciated that in the above discussion of FIG. 5, a probability threshold of 50% is used to determine whether or not an action is anomalous in nature. In other embodiments, the probability threshold may be some other value.

It is appreciated that in some embodiments the application 150 (FIG. 1) on the administrator's device 160 (FIG. 1) might allow the user to configure a determined probability above which the user requires a particular notification. For example, the application 150 (FIG. 1) on the administrator's device 160 (FIG. 1) might allow the user to configure that no notification will be sent if an event is considered "within the norm" (corresponding to a probability less than 50% that a false identity is being used). On the other hand, events which are considered highly probable that a false identity (for example, greater than a probability of 85%) is being used might require an immediate biometric authentication.

Figure 6:
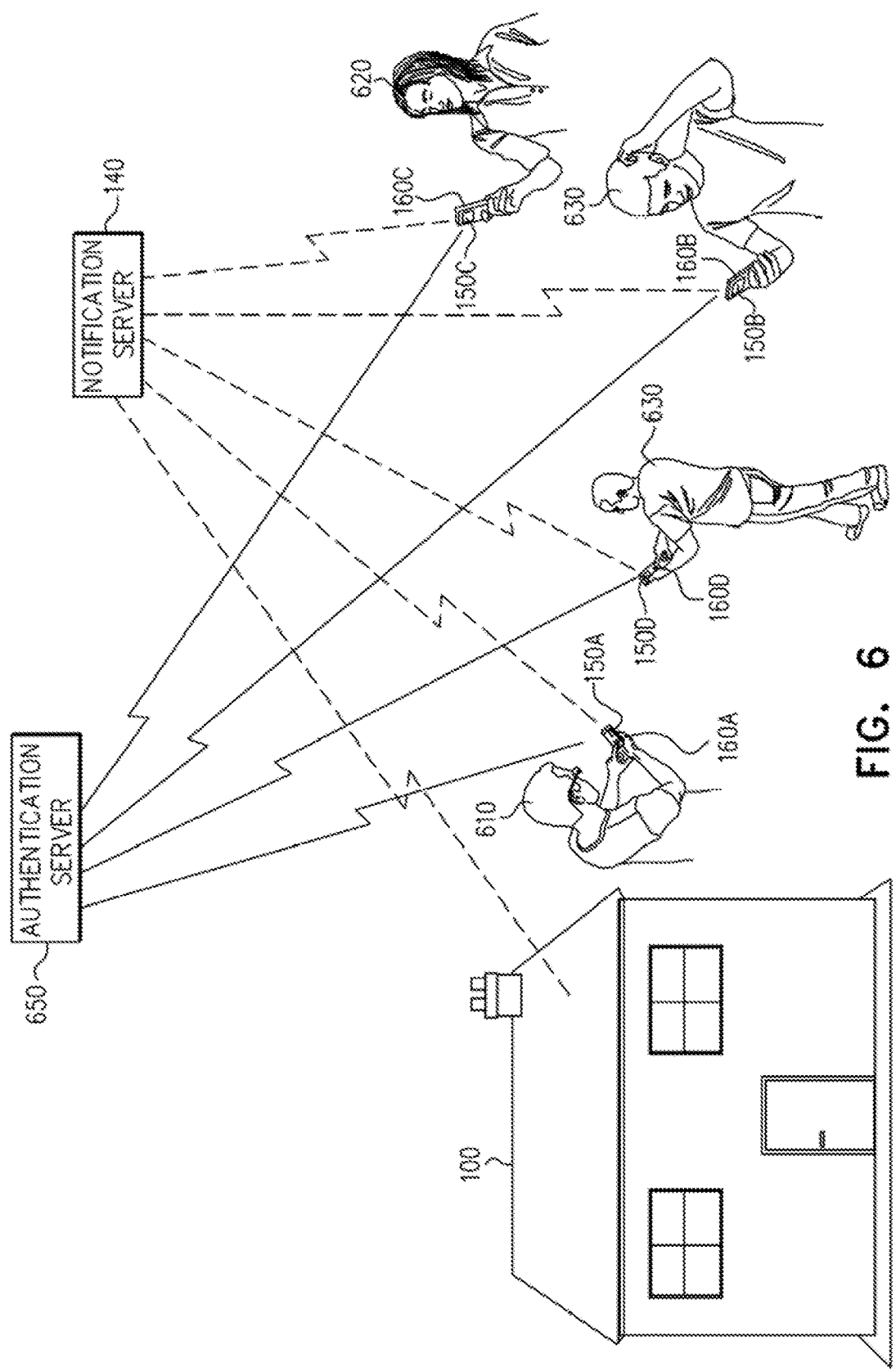
FIG. 6 is a pictorial illustration of members of the household resident in the smart home secured by the smart home security system of FIG. 1.

Reference is now additionally made to FIG. 6, which is a pictorial illustration of members of the household resident in the smart home 100 secured by the smart home security system of FIG. 1.

The smart home 100 administrator device 160 (FIG. 1), and more critically the application 150 (FIG. 1), is a potential security risk for the above described system. In the hands of an intruder, the smart home 100 administrator device 160 and the application 150 (FIG. 1) may be used to create a major breach in the security of the smart home 100. Accordingly, in some embodiments, a system is in place to ensure that the application 150 (FIG. 1) is available to, belongs to and is in possession of the actual smart home 100 administrator (typically the owner of the home network gateway 120 of FIG. 1), and that the administrator device 160 (FIG. 1) was not stolen, hijacked, or otherwise tampered with.

It is also appreciated that there may be instances of the application 150 among members of the household resident in the smart home 100, each instance owned by the different known members of the household. FIG. 6 shows that in a household, such as a family comprising a father 610, a mother 620, and two children 630, each member of the household may have their own administrator device 160A 160D, and each of those administrator devices 160A 160D may have an instance of the application 150A-150D.

The notification sent by the notification server 140 may be sent to the application 150A-150D on multiple administrator devices 160A-160D. For example, in one embodiment, both the father's 610 and the mother's 620 administrator devices 160A, 160B may receive the notification at the same time. Alternatively, the notification may be sent in a configurable order to the multiple devices 160A-160D. For example, first the mother's 620 administrator device 160B may receive the notification from the notification server 140. If the mother 620 does not reply in a configurable amount of time (e.g., 15 or 30 seconds), then the father's 610 administrator device 160A may receive the notification from the notification server 140. If the father 610 does not reply in the configurable amount of time, then a first one of the children's 630 administrator device 160C may receive the notification from the notification server 140. If the first one of the children 630 does not reply in the configurable amount of time, then a second one of the children's 630 administrator device 160D may receive the notification from the notification server 140. If the second one of the children 630 does not reply in the configurable amount of time, and there are no more holders of administrator devices 160, then no authorization or authentication will be given for the anomalous control message to one of the OEM network appliances 110A-110n of FIG. 1, which triggered the notification server 140.

Accordingly, in order to ensure secure authentication by one of the holders of the administrator device 160A-160D, the administrator device 160A-160D is enrolled and paired to the home network gateway 120. The pairing is performed at registration of the administrator device 160A-160D over a common WiFi link. That is to say that both the home network gateway 120 (FIG. 1) and the administrator device 160A-160D will typically be required to be co-located in the same network domain.

During registration, the application 150A-150D will collect and store biometric characteristics of the device holder (e.g. the father 610, the mother 620, and the children 630), in order to enable multi-factor authentication against a multi-factor authentication server 650 (voice recognition, facial recognition, retina recognition, etc.).

During authentication, depending on the criticality of the message or appliance, different levels of authentication may be required (e.g., 1-factor authentication, 2-factor authentication, more than 2-factor authentication). 1-factor authentication may be a reply to the message: Authorize or Not Authorized. 2-factor authentication may require a further step of biometric authentication, e.g. voice recognition, facial recognition, retina recognition, etc.

The notification server 140 will only accept the user confirmation upon receiving a proof of authentication based on shared secrets maintained between the multi-factor authentication server 650 and the notification server 140. It is also appreciated that in some embodiments, the authentication itself, at any stage and in any form, may comprise a cryptographically secure authentication. For example, the authentication may be sent over an encrypted network connection; the authentication may itself be encrypted; the authentication may be cryptographically signed; the authentication may include a message authentication code (MAC); and so forth, as is known in the art.

Figure 7:
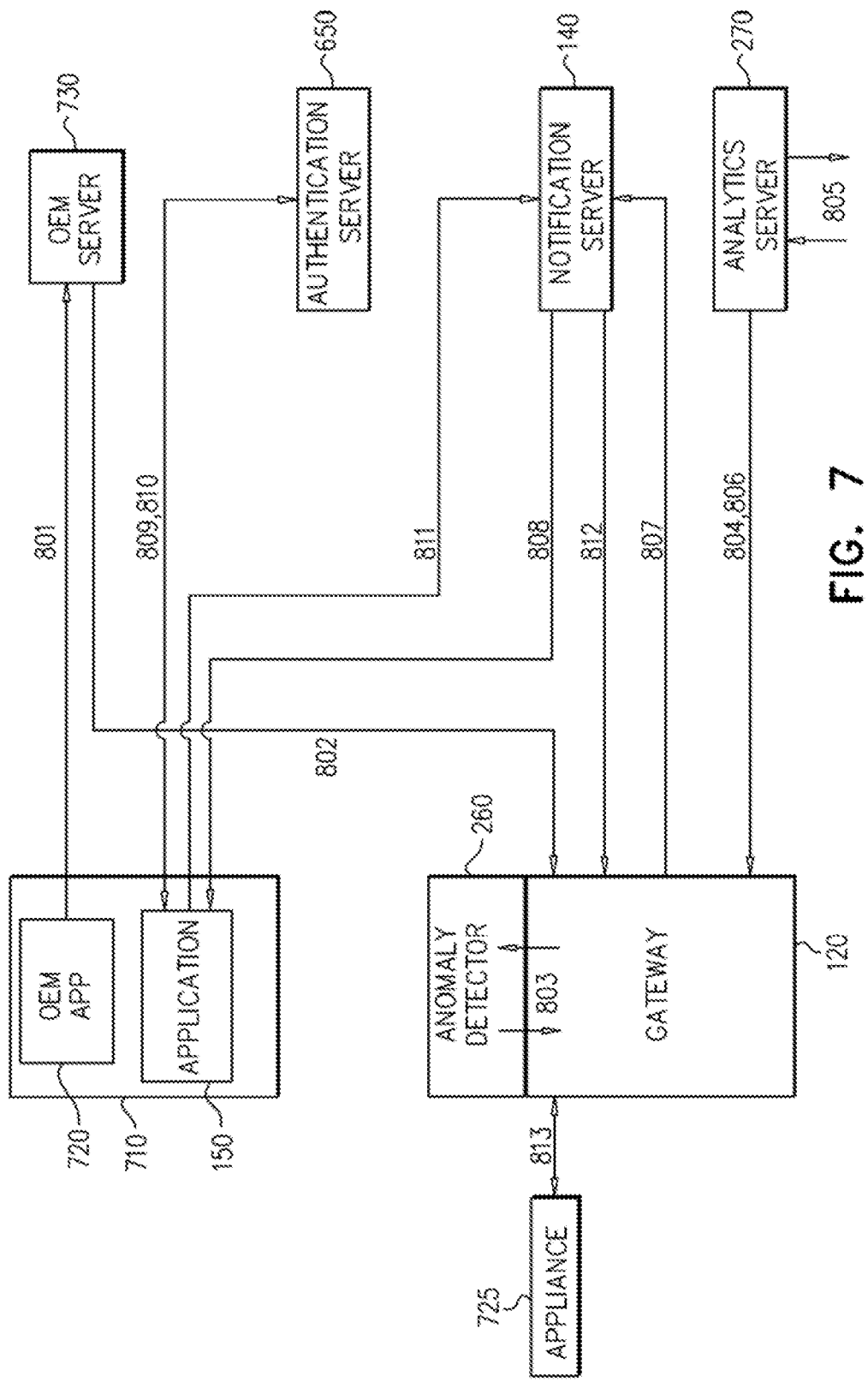
FIG. 7 is a first embodiment of a collaboration diagram describing the flow of packets in the smart home security system of FIG. 1.

Reference is now made to FIG. 7, which is a first embodiment of a collaboration diagram describes the flow of packets in the smart home security system of FIG. 1. A device 710, typically a mobile device such as a smart phone or a tablet computer, is running an OEM application 720. OEM application 720 sends commands to an OEM appliance 725 (such as the lights 110A of FIG. 1) via an OEM server 730. The device 710 is depicted as also running the application 150. However, as was depicted above in FIG. 2, the application 150 may be running on a second, different device from device 710. For ease of depiction in FIG. 7, both the application 150 and the OEM application are shown on the same device 710.

In step 801, the OEM application 720 sends OEM packets to the OEM server 730 (e.g., a command such as "turn on the bedroom lights"). The OEM server 730 relays the command, in OEM packets addressed to the OEM appliance 725, to the home network gateway 120 (step 802). In step 803, the OEM packets addressed to the OEM appliance 725 are sent to the anomaly detector 260 to determine if the OEM packets addressed to the OEM appliance 725 appear anomalous. Upon deciding that the OEM packets addressed to the OEM appliance 725 do appear anomalous, the packets are then sent to the cloud based analytics server 270 (step 804), which performs analytic analysis on the OEM packets addressed to the OEM appliance 725 (step 805), and returns the results of the analytic analysis to the home network gateway 120 (step 806).

Upon notification of the home network gateway 120 of the determination that the cloud based analytics server 270 that the OEM packets addressed to the OEM appliance 725 are anomalous, the home network gateway 120 activates the notification server 140 (step 807). In step 808, the notification server 140 sends a notification to the application 150 that requests the holder of the device 710, typically one of the administrators of the smart home 100 (FIG. 1), authorize the action indicated in the OEM packets sent to the OEM server 730 in step 801. Upon receipt of the administrator's authentication or authorization, the authentication server 650 requests single-factor (step 809) or multi-factor (step 810) authorization from the holder of the device 710. It is appreciated that the authentication server 650 may be embodied in the home gateway 120 (FIG. 1). Assuming that the holder of the device inputs the requested authorization via the application 150 (step 811), the notification server 140 forwards the authorization to the home network gateway 120 (step 812). Upon receipt of the authorization at the home network gateway 120 from the notification server 140, the home network gateway 120 forwards the OEM packets addressed to the OEM appliance 725 (received in step 802) to the OEM appliance 725 (step 813) for execution of the command contained in the OEM packets.

In an alternative embodiment, after the home network gateway 120 is triggered by the OEM server 730 (step 802), and positive anomaly detection at the cloud based analytics server 270 in step 805, the notification server 140 is triggered by the cloud based analytics server 270, without further involvement of the home network gateway 120. Flow then resumes at step 808, where the notification server 140 sends a notification to the application 150 that requests the holder of the device 710, and so forth.

In an alternative embodiment, an OEM vendor may integrate directly with the notification service 140. In such an embodiment, as in step 801, the OEM application 720 sends OEM packets to the OEM server 730 (e.g., a command such as "turn on the bedroom lights"). In step 802' (not depicted), the OEM server 730 will send packets directly to the notification server 140. In step 803' (similar to corresponding step 808), the notification server 140 sends a notification to the application 150 that requests the holder of the device 710, typically one of the administrators of the smart home 100, authorize the action indicated in the OEM packets sent to the OEM server 730 in step 801. Upon receipt of the administrator's authorization, the authentication server 650 requests single-factor (as in step 809) or multi-factor (as in step 810) authorization from the holder of the device 710. Assuming that the holder of the device performs the requested authorization (as in step 811), the notification server 140 forwards the authorization to the OEM server 730 (step 812', not depicted). The OEM server 730 now relays the command, in OEM packets addressed to the OEM appliance 725, to the home network gateway 120 (as in step 802). Finally, as in step 813, the home network gateway 120 forwards the OEM packets addressed to the OEM appliance 725 (received in step 802) to the OEM appliance 725 for execution of the command contained in the OEM packets.

It is appreciated that at either of steps 803 or 806, a determination that the OEM packets addressed to the OEM appliance 725 are not anomalous—i.e. that no further authorization is required—results in skipping immediately to step 813.

Figure 8:
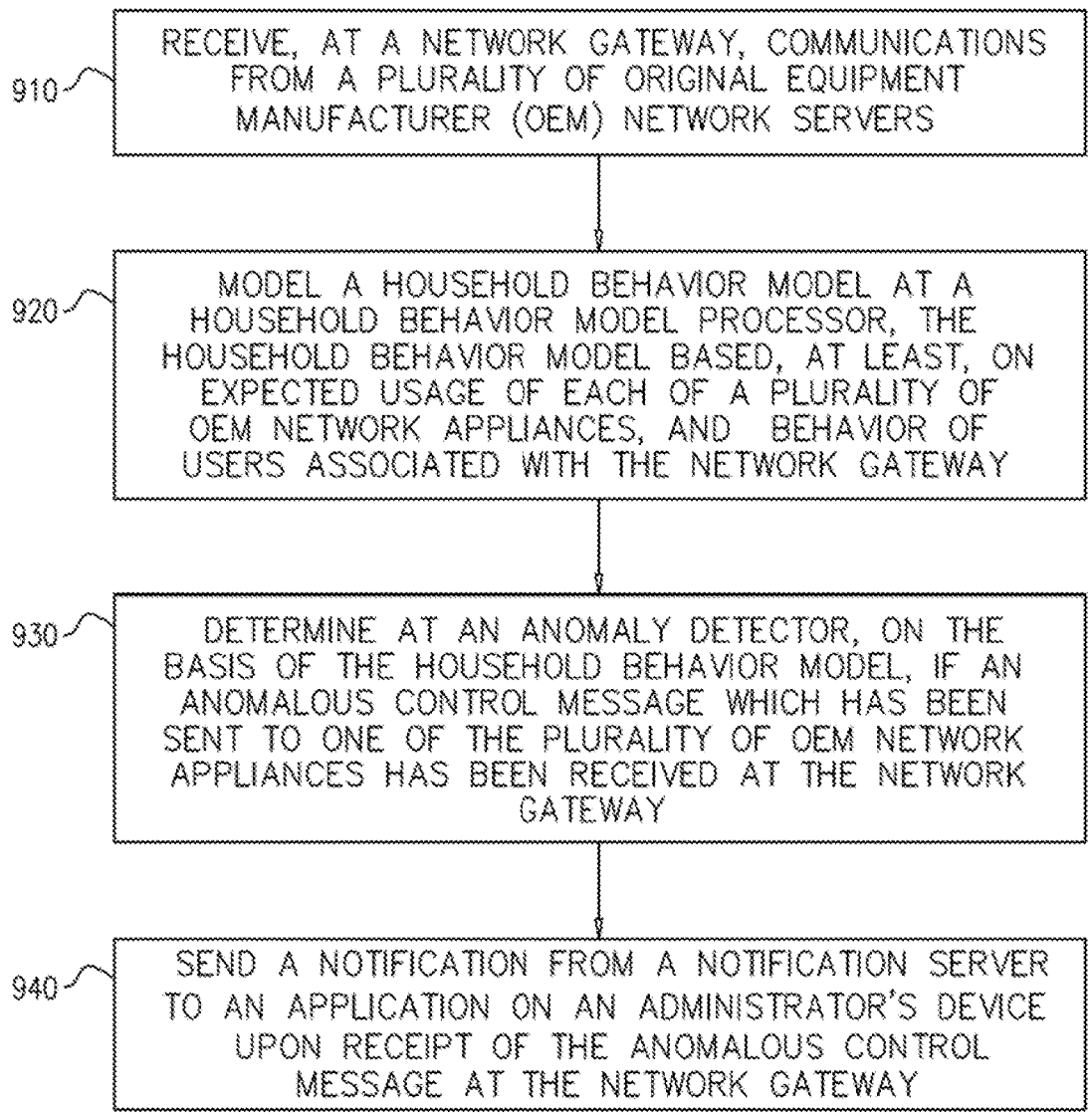
FIG. 8 is a simplified flow chart of one embodiment of a method for the smart home security system of FIG. 1.

Reference is now made to FIG. 8, which is a simplified flow chart of one embodiment of a method for the smart home security system of FIG. 1. At step 910, the network gateway 120 (FIG. 1) receives communications from the plurality of OEM servers 210A, 210D (FIG. 2), which are used for controlling the OEM appliances 110A-110n (FIG. 1) distributed throughout the smart home 100 (FIG. 1).

The household behavior model processor 130 (FIG. 1) models a household behavior model (step 920), the household behavior model based, at least, on expected usage of each of the plurality of OEM network appliances 110A-110n (FIG. 1), and behavior of users associated with the network gateway 120 (FIG. 1).

At step 930, the anomaly detector 260 (FIG. 2) determines, on the basis of the household behavior model, if an anomalous control message which has been sent to one of the plurality of OEM network appliances 110A-110n (FIG. 1) has been received at the network gateway 120 (FIG. 1).

Upon receipt of the anomalous control message at the network gateway 120 (FIG. 1), the notification server 140

(FIG. 1) will send a notification to the application 150 (FIG. 1) on the administrator's device 160 (FIG. 1).

It is appreciated that software components of the present disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It is appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable subcombination.

It will be appreciated by persons skilled in the art that the present disclosure is not limited by what has been particularly shown and described hereinabove. Rather the scope of the disclosure is defined by the appended claims and equivalents thereof:

What is claimed is:

1. A system comprising:
   a network gateway configured to communicate with a plurality of original equipment manufacturer (OEM) servers;
   a household behavior model processor configured to generate a household behavior model based at least on:
      expected usage of each of a plurality of OEM network appliances, wherein each one appliance of the plurality of OEM network appliances is associated with one of the plurality of OEM servers; and
      behavior of users associated with the network gateway;
   an anomaly detector configured to determine, based on the household behavior model, whether a control message, which is associated with a first one of the plurality of OEM network appliances and has been received at the network gateway, is anomalous; and
   a notification server configured to send a notification to an application on an administrator's device in response to the anomaly detector determining that the control message is anomalous.

2. The system according to claim 1 and further comprising a receiver at the network gateway for receiving, in response to the notification, an authorization for the control message.

3. The system according to claim 2 wherein the authorization comprises a cryptographically secure authorization.

4. The system according to claim 1 and further comprising a receiver at the network gateway for receiving, in response to the notification, a biometric verification for the control message.

5. The system according to claim 1 wherein the network gateway is configured to quarantine the control message determined to be anomalous until a positive response comprising an authorization is received from the application on the administrator's device.

6. The system according to claim 1 wherein the notification server is configured to send the notification to the application on the administrator's device after the first one of the plurality of OEM network appliances receives the control message.

7. The system according to claim 1 wherein a response to the notification comprises setting a dormant time for the first one of the plurality of OEM network appliances, the dormant time comprising a time during which the notification server does not send notifications concerning the first one of the plurality of OEM network appliances to the administrator's device.

8. The system according to claim 1 wherein the notification comprises a cryptographically secure notification.

9. The system according to claim 1 wherein the household behavior model processor is configured to receive support to generate the household behavior model from a cloud based analytics server.

10. The system according to claim 1 wherein the household behavior model processor is configured to adjust the household behavior model over time based at least on one or more of feedback or received authorizations.

11. The system according to claim 1, wherein when an indication of approval is received from the administrator's device in response to the notification, the network gateway is configured to forward the control message to the first one of the plurality of OEM network appliances.

12. A method comprising:
   receiving, at a network gateway, communications from one of a plurality of original equipment manufacturer (OEM) servers;
   generating a household behavior model at a household behavior model processor, the household behavior model based, at least, on:
      expected usage of each of a plurality of OEM network appliances, wherein each one appliance of the plurality of OEM network appliances is associated with one of the plurality of OEM servers; and
      behavior of users associated with the network gateway;
   determining at an anomaly detector, based on the household behavior model, whether a control message, which is associated with a first one of the plurality of OEM network appliances and has been received at the network gateway, is anomalous; and
   sending a notification from a notification server to an application on an administrator's device in response to the anomaly detector determining that the control message is anomalous.

13. The method according to claim 12 wherein, in response to the notification, an authorization for the control message is received at the network gateway.

14. The method according to claim 13 wherein the authorization comprises at least one of a cryptographically secure authorization or a biometric verification.

15. The method according to claim 12 wherein the network gateway quarantines the control message until a positive response comprising an authorization is received from the application on the administrator's device.

16. The method according to claim 12 wherein a response to the notification comprises setting a dormant time for the first one of the plurality of OEM network appliances, the dormant time comprising a time during which the notification server does not send notifications concerning the first one of the plurality of OEM network appliances to the administrator's device.

17. The method according to claim 12 wherein the notification comprises a cryptographically secure notification.

18. The method according to claim 12 wherein the household behavior model processor adjusts the household behavior model over time based at least on one of: feedback; and received authorizations.

19. The method according to claim 12, wherein when an indication of approval is received from the administrator's device in response to the notification, the method further comprises:
  forwarding the control message from the network gateway to the first one of the plurality of OEM network appliances.

20. A non-transitory computer-readable medium including contents that are configured to cause a computing system to perform a method comprising:
  receiving, at a network gateway, communications from a plurality of original equipment manufacturer (OEM) network appliances;
  generating a household behavior model at a household behavior model processor, the household behavior model based, at least, on:
    expected usage of each of the plurality of OEM network appliances; and
    behavior of users associated with the network gateway;
  at an anomaly detector, determining, based on the household behavior model, whether a control message, which is associated with a first one of the plurality of OEM network appliances and has been received at the network gateway, is anomalous; and
  sending a notification from a notification server to an application on an administrator's device in response to the anomaly detector determining that the control message is anomalous.

* * * * *